(12) United States Patent
Murata

(10) Patent No.: US 10,001,068 B2
(45) Date of Patent: Jun. 19, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Masaya Murata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/269,510

(22) Filed: Sep. 19, 2016

(65) Prior Publication Data

US 2017/0089272 A1    Mar. 30, 2017

(30) Foreign Application Priority Data

Sep. 24, 2015  (JP) ................................. 2015-186853

(51) Int. Cl.
| | |
|---|---|
| F02D 19/08 | (2006.01) |
| F02D 19/06 | (2006.01) |
| F02D 41/00 | (2006.01) |
| F02D 41/06 | (2006.01) |

(52) U.S. Cl.
CPC ....... *F02D 19/081* (2013.01); *F02D 19/0615* (2013.01); *F02D 19/0634* (2013.01); *F02D 19/0647* (2013.01); *F02D 19/084* (2013.01); *F02D 41/0025* (2013.01); *F02D 41/0027* (2013.01); *F02D 19/087* (2013.01); *F02D 41/068* (2013.01); *F02D 2200/0611* (2013.01); *F02D 2250/11* (2013.01); *Y02T 10/36* (2013.01)

(58) Field of Classification Search
CPC ............. F02D 41/0025; F02D 41/0027; F02D 19/0647; F02D 19/081; F02D 41/062; F02D 19/0655; F02D 19/0642

See application file for complete search history.

(56) References Cited

U.S. PATENT DOCUMENTS

| | | | | |
|---|---|---|---|---|
| 5,411,058 | A | * 5/1995 | Welsh ................. | F02D 19/0647 137/572 |
| 5,816,224 | A | * 10/1998 | Welsh ................. | F02D 19/0647 123/525 |
| 8,113,186 | B2 | * 2/2012 | Tsunooka ............ | F02D 41/0025 123/520 |
| 2013/0030671 | A1 | 1/2013 | Hoshi et al. | |
| 2014/0303875 | A1 | * 10/2014 | Tsukagoshi ........... | F02D 41/123 701/104 |
| 2015/0152793 | A1 | * 6/2015 | Matsuda ................. | F02D 17/00 60/285 |

FOREIGN PATENT DOCUMENTS

| | | |
|---|---|---|
| JP | 2001-050114 A | 2/2001 |
| JP | 2009-144613 A | 7/2009 |
| JP | 2015-105582 A | 6/2015 |
| WO | 2011/158353 A1 | 12/2011 |

* cited by examiner

*Primary Examiner* — Long T Tran
(74) *Attorney, Agent, or Firm* — Oliff PLC

(57) ABSTRACT

A control apparatus is applied to an internal combustion engine in which fuel used for operation is changed between liquid fuel containing alcohol and gas fuel. The control apparatus includes an electronic control unit configured to prohibit use of the gas fuel when a ratio of dilution of lubricating oil by the liquid fuel in a lubricating oil storage portion of the internal combustion engine is equal to or larger than a predetermined value or when an amount of the liquid fuel mixed in the lubricating oil in the lubricating oil storage portion is equal to or larger than a predetermined amount.

2 Claims, 5 Drawing Sheets

CONTROL APPARATUS FOR INTERNAL COMBUSTION ENGINE

INCORPORATION BY REFERENCE

The disclosure of Japanese Patent Application No. 2015-186853 filed on Sep. 24, 2015 including the specification, drawings and abstract is incorporated herein by reference in its entirety.

BACKGROUND

1. Technical Field

The disclosure relates to a control apparatus for an internal combustion engine. In particular, the disclosure relates to a control apparatus that is applied to an internal combustion engine in which the fuel used for operation can be changed between alcohol-containing liquid fuel and gas fuel.

2. Description of Related Art

Conventionally, as disclosed in Re-publication of PCT International Publication WO 2011/158353, there is known an internal combustion engine in which the fuel used for operation can be changed between alcohol-containing liquid fuel (e.g., liquid fuel containing alcohol and gasoline) and gas fuel (e.g., compressed natural gas (CNG)). This kind of internal combustion engine includes a liquid fuel tank in which liquid fuel is stored, and a gas fuel bottle in which gas fuel is provided. The fuel used for the operation of the internal combustion engine can be changed between liquid fuel and gas fuel, in accordance with the operating state of the internal combustion engine.

SUMMARY

It is also known that as the properties of gas fuel, gas fuel has a narrow flammability range up to a flammability limit on the rich side (on the side where the air-fuel ratio is small) as compared to liquid fuel, and therefore gas fuel is likely to cause so-called rich misfire (misfire resulting from a small air-fuel ratio) (refer to, for example, Japanese Patent Application Publication No. 2001-50114 (JP 2001-50114 A)).

In order to enhance the practicality of this internal combustion engine in which fuel in use can be changed between liquid fuel and gas fuel, it is necessary to avoid the rich misfire.

The inventor of the disclosure examined a situation where the rich misfire is caused, and considered performing the control that makes it possible to avoid this rich misfire in the case where there is a possibility that this situation may occur.

The disclosure provides a control apparatus that can avoid rich misfire in an internal combustion engine in which fuel used for operation can be changed between alcohol-containing liquid fuel and gas fuel.

An aspect of the disclosure relates to a control apparatus that is applied to an internal combustion engine in which fuel used for operation is changed between liquid fuel containing alcohol and gas fuel. The control apparatus includes an electronic control unit configured to prohibit use of the gas fuel when a ratio of dilution of lubricating oil by the liquid fuel in a lubricating oil storage portion of the internal combustion engine is equal to or larger than a predetermined value or when an amount of the liquid fuel mixed in the lubricating oil in the lubricating oil storage portion is equal to or larger than a predetermined amount.

With the above-described configuration, when the ratio of dilution of the lubricating oil by the liquid fuel in the lubricating oil storage portion of the internal combustion engine is equal to or larger than the predetermined value or when the amount of the liquid fuel mixed in the lubricating oil in the lubricating oil storage portion is equal to or larger than the predetermined amount, the electronic control unit prohibits the use of the gas fuel. That is, when there is a possibility that the air-fuel ratio in a cylinder may become small as a result of the introduction of the fuel evaporated in the lubricating oil storage portion into an intake system (when there is a possibility that the air-fuel ratio may become so small as to cause rich misfire in the case where the gas fuel is used), the electronic control unit prohibits the use of the gas fuel. Accordingly, the rich misfire of the gas fuel can be avoided by refraining from using the gas fuel in a situation where the air-fuel ratio in the cylinder becomes small.

The internal combustion engine may use the liquid fuel during warm-up operation, and may use the gas fuel after completion of warm-up; and the electronic control unit may be configured to prohibit a change of fuel in use from the liquid fuel to the gas fuel when the ratio of dilution of the lubricating oil by the liquid fuel in the lubricating oil storage portion is equal to or larger than the predetermined value, and to permit the change of the fuel in use from the liquid fuel to the gas fuel on a condition that the ratio of dilution should be smaller than the predetermined value, after the completion of the warm-up.

Thus, even in the case where the warm-up operation of the internal combustion engine is completed, when the ratio of dilution of the lubricating oil by the liquid fuel in the lubricating oil storage portion is equal to or larger than the predetermined value and there is a possibility that the air-fuel ratio in the cylinder may become small due to the introduction of the fuel evaporated in the lubricating oil storage portion into the intake system, the change of the fuel in use from the liquid fuel to the gas fuel is prohibited. Then, after that, the change of the fuel in use from the liquid fuel to the gas fuel is permitted on the condition that the ratio of dilution should be smaller than the predetermined value. Therefore, the time for changing the fuel in use from the liquid fuel to the gas fuel can be set to an appropriate time that makes it possible to avoid the rich misfire of the gas fuel, after the completion of the warm-up operation of the internal combustion engine.

The internal combustion engine may use the liquid fuel during warm-up operation, and may use the gas fuel after completion of warm-up; and the electronic control unit may be configured to prohibit a change of fuel in use from the liquid fuel to the gas fuel when the amount of the liquid fuel mixed in the lubricating oil in the lubricating oil storage portion is equal to or larger than the predetermined amount, and to permit the change of the fuel in use from the liquid fuel to the gas fuel on a condition that the amount of the mixed liquid fuel should be smaller than the predetermined amount, after the completion of the warm-up.

With the above-described configuration, the time for changing the fuel in use from the liquid fuel to the gas fuel can be set to an appropriate time that makes it possible to avoid the rich misfire of the gas fuel, after the completion of the warm-up operation of the internal combustion engine.

The internal combustion engine may use the liquid fuel during warm-up operation, and may use the gas fuel after completion of warm-up; and the electronic control unit may be configured to prohibit a change of fuel in use from the liquid fuel to the gas fuel when the ratio of dilution of the lubricating oil by the liquid fuel in the lubricating oil storage portion is equal to or larger than the predetermined value, and to permit the change of the fuel in use from the liquid fuel to the gas fuel after an elapse of a predetermined time from a time point at which the ratio of dilution becomes smaller than the predetermined value, after the completion of the warm-up.

The above-described configuration is provided taking into account the following. Even when the ratio of dilution of the lubricating oil by the liquid fuel in the lubricating oil storage portion becomes smaller than the predetermined value, there is a possibility that the fuel evaporated in the lubricating oil storage portion may still remain without being introduced into the cylinder, in a range from the lubricating oil storage portion to the intake system of the internal combustion engine. After that, this remaining fuel may be introduced into the cylinder, and the air-fuel ratio in the cylinder may become small. That is, rich misfire may be caused due to the remaining fuel in the case where the gas fuel is used. In the above-described configuration, the change of the fuel in use from the liquid fuel to the gas fuel is permitted after the elapse of the predetermined time from the time point when the ratio of dilution becomes smaller than the predetermined value. That is, the contribution of the remaining fuel to the combustion in the cylinder is awaited, and then, the fuel in use can be changed over from the liquid fuel to the gas fuel. Thus, the rich misfire of the gas fuel resulting from the remaining fuel can be avoided.

The internal combustion engine may use the liquid fuel during warm-up operation, and may use the gas fuel after completion of warm-up; and the electronic control unit may be configured to prohibit a change of fuel in use from the liquid fuel to the gas fuel when the amount of the liquid fuel mixed in the lubricating oil in the lubricating oil storage portion is equal to or larger than the predetermined amount, and to permit the change of the fuel in use from the liquid fuel to the gas fuel after an elapse of a predetermined time from a time point at which the amount of the mixed liquid fuel becomes smaller than the predetermined amount, after completion of the warm-up.

In this case as well, the contribution of the remaining fuel to the combustion in the cylinder is awaited, and then, the fuel in use can be changed from the liquid fuel to the gas fuel. Therefore, the rich misfire of the gas fuel resulting from the remaining fuel can be avoided.

In the above-described aspect of the disclosure, the use of the gas fuel is prohibited when the ratio of dilution of the lubricating oil by the liquid fuel in the lubricating oil storage portion of the internal combustion engine is equal to or larger than the predetermined value or when the amount of the liquid fuel mixed in the lubricating oil in the lubricating oil storage portion is equal to or larger than the predetermined amount. Thus, the rich misfire of the gas fuel can be avoided by refraining from using the gas fuel in a situation where the air-fuel ratio in the cylinder becomes small.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments will be described hereinafter based on the drawings. In each of the embodiments, a case where the disclosure is applied to a multi-cylinder (e.g., four-cylinder) spark ignition engine (internal combustion engine) will be described.

Figure 1:
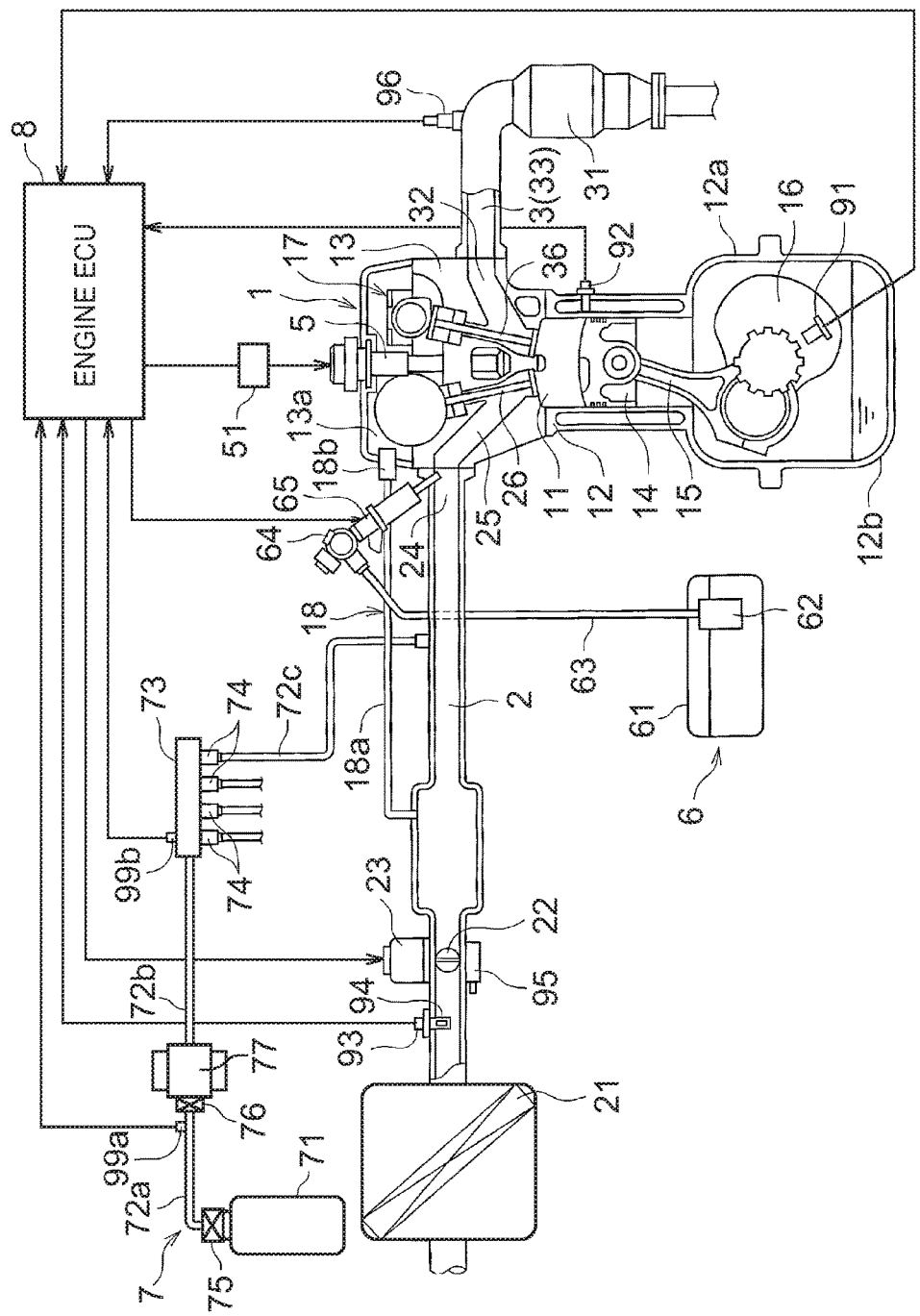
FIG. 1 is a view showing a schematic configuration of an engine according to each of embodiments.

FIG. 1 is a view showing a schematic configuration of an engine 1 according to each of the embodiments. FIG. 1 shows only the configuration of one cylinder of the engine 1. In this engine 1, the fuel used for operation can be changed between alcohol-containing liquid fuel and gas fuel. More specifically, liquid fuel containing alcohol (e.g., ethanol) and gasoline is adopted as liquid fuel. Compressed natural gas (CNG) is adopted as gas fuel.

The engine 1 according to each of the embodiments includes a cylinder block 12 in which four cylinders 11 are formed, and a cylinder head 13 that is attached to an upper portion of this cylinder block 12. Pistons 14 are inserted in a reciprocable manner in the cylinders 11 respectively. Each of the pistons 14 is connected to a crankshaft 16 via a connecting rod 15.

An air cleaner 21, an airflow meter 93, an intake air temperature sensor 94 and a throttle valve 22 are provided in an intake passage 2 of the engine 1. The throttle valve 22 is driven by a throttle motor 23. This intake passage 2 includes an intake manifold 24 through which intake air is distributed to the cylinders 11, and intake ports 25 that are respectively provided for the cylinders 11 and that are connected to the intake manifold 24.

An air-fuel ratio sensor (A/F sensor) 96 and a catalytic converter 31 are provided in an exhaust passage 3. This exhaust passage 3 includes exhaust ports 32 that are respectively provided for the cylinders 11, and an exhaust manifold 33 to which the exhaust ports 32 are connected.

The cylinder head 13 is provided with intake valves 26 that open and close the intake ports 25 respectively, and exhaust valves 36 that open and close the exhaust ports 32 respectively. The valves 26 and 36 are driven to be opened and closed in synchronization with the crankshaft 16 by a valve operating mechanism 17.

Each of the cylinders 11 is provided with an ignition plug 5 for igniting an air-fuel mixture introduced thereinto. The ignition timing of this ignition plug 5 is adjusted by an igniter 51.

A fuel supply system of the engine 1 according to each of the present embodiments includes a liquid fuel supply system 6 and a gas fuel supply system 7.

The liquid fuel supply system 6 includes a liquid fuel tank 61 in which the liquid fuel is stored, a fuel pump 62, a liquid fuel supply pipe 63, a liquid fuel delivery pipe 64, and liquid fuel injectors 65 that are respectively provided for the cylinders.

In this liquid fuel supply system 6, the fuel pump 62 pumps up the liquid fuel in the liquid fuel tank 61, and delivers under pressure the liquid fuel to the liquid fuel delivery pipe 64 via the liquid fuel supply pipe 63. Then, a given one of the liquid fuel injectors 65 is opened, so the liquid fuel is injected toward a specific one of the cylinders 11.

The gas fuel supply system 7 includes a gas fuel bottle (gas fuel container) 71 in which the gas fuel is provided, gas fuel pipes 72a, 72b and 72c, a regulator 77, a gas fuel delivery pipe 73, and gas fuel injectors 74 that are respectively provided for the cylinders.

The gas fuel pipes 72a, 72b and 72c are configured as a high pressure-side pipe 72a, a first low pressure-side pipe 72b, and a second low pressure-side pipe 72c. The gas fuel bottle 71 and the regulator 77 are connected to each other by the high pressure-side pipe 72a. The regulator 77 and the gas fuel delivery pipe 73 are connected to each other by the first low pressure-side pipe 72b. Each of the gas fuel injectors 74 and the intake manifold 24 are connected to each other by the second low pressure-side pipe 72c. The regulator 77 is configured to reduce the pressure of the gas fuel supplied from the gas fuel bottle 71 to a predetermined pressure. An electromagnetically driven first shutoff valve 75 is provided in a connection region between the gas fuel bottle 71 and the high pressure-side pipe 72a. An electromagnetically driven second shutoff valve 76 is provided in a connection region between the high pressure-side pipe 72a and the regulator 77. The high pressure-side pipe 72a is provided with a high pressure-side gas pressure sensor 99a, and the gas fuel delivery pipe 73 is provided with a low pressure-side gas pressure sensor 99b.

In this gas fuel supply system 7, when both the first shutoff valve 75 and the second shutoff valve 76 are opened, gas fuel is supplied from the gas fuel bottle 71 to the gas fuel delivery pipe 73 via the high pressure-side pipe 72a and the first low pressure-side pipe 72b. Then, a given one of the gas fuel injectors 74 is opened, and thus, gas fuel is injected from the gas fuel delivery pipe 73 toward a specific one of the cylinders 11 via this gas fuel injector 74.

In the engine 1 thus configured, fuel is injected from the liquid fuel injector 65 or the gas fuel injector 74 toward one of the cylinders 11 which is in an intake stroke, and thus, the air-fuel mixture is introduced into the cylinder 11. Then, after a compression stroke, the air-fuel mixture is ignited by the sparks of the ignition plug 5, and burns. The piston 14 reciprocates due to a combustion pressure generated through the burning of the air-fuel mixture. The reciprocating movement is transmitted to the crankshaft 16 via the connecting rod 15 and taken out as an output of the engine 1.

The exhaust gas produced after combustion is guided to the exhaust passage 3, purified in the catalytic converter 31, and then discharged to the atmosphere via a muffler (not shown).

The engine 1 includes a positive crankcase ventilation (PCV) device 18 for guiding the blow-by gas that has blown into a crankcase 12a through a gap between an inner surface of the cylinder and the piston 14, to the intake passage 2. This PCV device 18 includes a blow-by gas collecting passage (not shown) for guiding the blow-by gas present in the crankcase 12a into a cam chamber 13a. The cam chamber 13a and the intake passage 2 are in communication with each other by a blow-by gas recirculation pipe 18a. A PCV valve 18b for preventing backflow of blow-by gas is provided at an upstream end of this blow-by gas recirculation pipe 18a.

Thus, the blow-by gas collected from an inside of the crankcase 12a by the blow-by gas collecting passage is introduced into the intake passage 2 via the cam chamber 13a, the PCV valve 18b and the blow-by gas recirculation pipe 18a. As will be described later, in the case where liquid fuel that flows into an oil pan (a lubricating oil storage portion) 12b at a lower portion of the crankcase 12a to dilute lubricating oil (engine oil) evaporates, this fuel (evaporative fuel) is also introduced into the intake passage 2 via the blow-by gas collecting passage, the cam chamber 13a, the PCV valve 18b and the blow-by gas recirculation pipe 18a.

Figure 2:
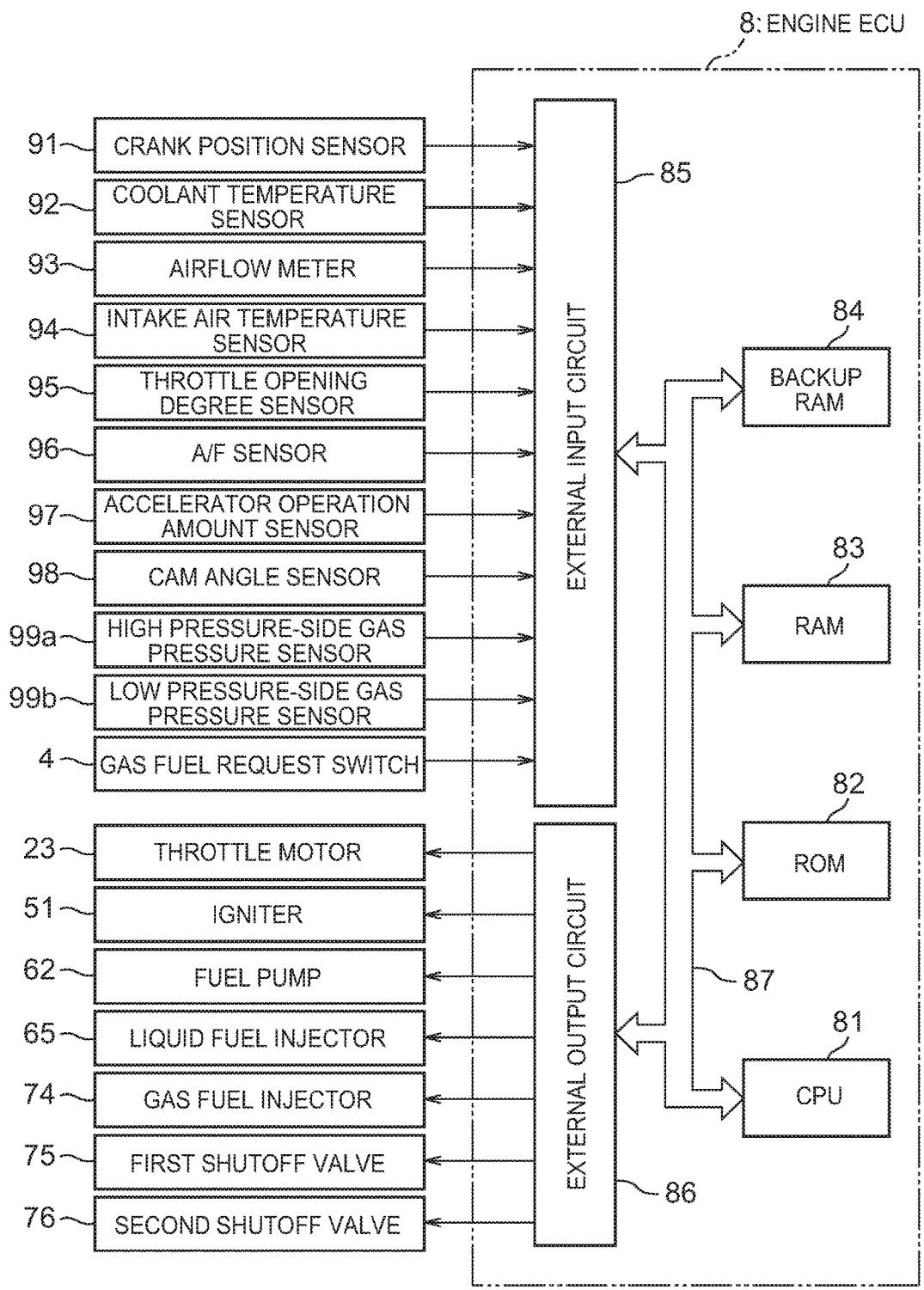
FIG. 2 is a block diagram showing a control system of the engine.

The operating state of the engine 1 configured as described above is controlled by an engine electronic control unit (an engine ECU) 8. As shown in FIG. 2, this engine ECU 8 includes a central processing unit (CPU) 81, a read only memory (ROM) 82, a random access memory (RAM) 83, a backup RAM 84 and the like.

This CPU 81, this ROM 82, this RAM 83 and this backup RAM 84 are connected to each other via a bus 87, and are connected to an external input circuit 85 and an external output circuit 86. A crank position sensor 91, a coolant temperature sensor 92, the airflow meter 93, an intake air temperature sensor 94, a throttle opening degree sensor 95, the A/F sensor 96, an accelerator operation amount sensor 97, a cam angle sensor 98, the high pressure-side gas pressure sensor 99a, the low pressure-side gas pressure sensor 99b and the like are connected to the external input circuit 85. The configurations and functions of the respective sensors are well known, so the description thereof is omitted herein.

A gas fuel request switch 4 is connected to the external input circuit 85. The gas fuel request switch 4 is a switch that is disposed in a vehicle compartment and that is turned ON when a driver of a vehicle requests gas fuel as the fuel in use. That is, when this gas fuel request switch 4 is ON, gas fuel is used unless a condition for prohibiting the use of gas fuel is fulfilled (unless, for example, a condition that an oil dilution ratio (described later) is equal to or larger than a predetermined value, or a condition that the engine 1 is in warm-up operation is fulfilled).

On the other hand, the throttle motor 23, the igniters 51, the fuel pump 62, the liquid fuel injectors 65, the gas fuel injectors 74, the first shutoff valve 75, the second shutoff valve 76 and the like are connected to the external output circuit 86.

The engine ECU 8 performs various kinds of control for the engine 1 based on detection signals of the various sensors and the like. For example, fuel injection amount control (the control of the amount of liquid fuel injected from the liquid fuel injector 65, the control of the amount of gas fuel injected from the gas fuel injector 74, and the like), ignition timing control for the ignition plugs 5, drive control for the throttle motor 23 and the like are performed.

The engine ECU 8 performs fuel-in-use change control that changes the fuel in use between liquid fuel and gas fuel, based on detection signals of the various sensors, an ON/OFF signal of the gas fuel request switch 4, and the like.

When the engine ECU 8 operates the engine 1 through the use of the liquid fuel injectors 65, the engine ECU 8 drives the fuel pump 62 to supply the liquid fuel in the liquid fuel tank 61 to the liquid fuel delivery pipe 64. Then, the engine ECU 8 operates the liquid fuel injectors 65 in an opening/closing manner and thereby causes liquid fuel to be injected from these liquid fuel injectors 65 to the intake passage 2. The mode of the fuel supply system at the time when the engine 1 is operated through the use of this liquid fuel will be referred to hereinafter as a liquid fuel operation mode. When the engine 1 is operated in this liquid fuel operation mode, both the first shutoff valve 75 and the second shutoff valve 76 are closed. Thus, the gas fuel bottle 71 and the gas fuel injector 74 are shut off from each other.

In contrast, when the engine ECU 8 operates the engine 1 through the use of the gas fuel injectors 74, the engine ECU 8 opens both the first shutoff valve 75 and the second shutoff valve 76, and thus provides communication between the gas fuel bottle 71 and the gas fuel injectors 74. Then, the engine ECU 8 operates the gas fuel injectors 74 in an opening/closing manner, and thereby causes gas fuel to be injected from these gas fuel injectors 74 to the intake passage 2. The mode of the fuel supply system at the time when the engine 1 is operated through the use of this gas fuel will be referred to hereinafter as a gas fuel operation mode.

Next, fuel-in-use change control will be described.

The basic operation of fuel-in-use change control will be described. The basic operation of this fuel-in-use change control is performed when the ratio of dilution of lubricating oil by fuel (liquid fuel) in the oil pan 12b (hereinafter referred to as an oil dilution ratio) is smaller than a predetermined value. In the basic operation of this fuel-in-use change control, liquid fuel is used during warm-up operation after cold start of the engine 1, and the fuel in use is changed from liquid fuel to gas fuel after the completion of the warm-up of the engine 1, on the condition that the gas fuel request switch 4 should be ON.

More specifically, when the ignition switch is turned ON to start the engine 1 in a cold state, the engine ECU 8 sets the operation mode of the engine 1 to the liquid fuel operation mode. That is, the operation of the engine 1 is performed through the use of liquid fuel during warm-up operation after cold start.

Then, when the coolant temperature reaches a predetermined temperature (a warm-up completion temperature) such that warm-up operation is completed while the gas fuel request switch 4 is not turned OFF during the execution of this liquid fuel operation mode, the engine ECU 8 changes the operation mode of the engine 1 from the liquid fuel operation mode to the gas fuel operation mode. That is, the operation of the engine 1 is changed to the operation through the use of gas fuel. While the engine 1 continues to be operated afterward, the operation in the gas fuel operation mode is continued unless the gas fuel request switch 4 is turned OFF.

Next, fuel-in-use change control according to the present embodiments will be described.

As described above, as the properties of gas fuel, gas fuel has a narrow flammability range up to a flammability limit on the rich side (on the side where the air-fuel ratio is small) as compared to liquid fuel, and therefore gas fuel is likely to cause so-called rich misfire (misfire resulting from a small air-fuel ratio). The air-fuel ratio in the cylinders 11 may decrease to a small value at which the rich misfire is caused, for example, in the case where the oil dilution ratio is equal to or larger than the predetermined value. That is, in the case where the oil dilution ratio is equal to or larger than the predetermined value, when the liquid fuel that dilutes this lubricating oil evaporates, the fuel is guided to the intake passage 2 via the blow-by gas collecting passage and the blow-by gas recirculation pipe 18a, and the air-fuel ratio in the cylinders 11 decreases to a small value at which the rich misfire is caused (i.e., the air-fuel ratio in the cylinders 11 becomes so rich as to cause rich misfire). When gas fuel is used in this situation, rich misfire may be caused in this gas fuel, and engine stall may occur.

The oil dilution ratio becomes large, for example, for the following reason. When the engine 1 is operated in the liquid fuel operation mode (e.g., during the warm-up operation), part of the liquid fuel injected from the liquid fuel injectors 65 adheres to inner wall surfaces of the cylinders, and this liquid fuel that remains in a liquid phase mixes with lubricating oil (the lubricating oil that contributes to the lubrication of the inner wall surfaces of the cylinders). That is, the fuel that has mixed with this lubricating oil is scratched (scraped) off from the inner wall surfaces of the cylinders as the pistons 14 reciprocate. This fuel then flows into the oil pan 12b. In particular, alcohol exhibits lower volatility than gasoline. Therefore, this alcohol is accumulated in the lubricating oil stored in the oil pan 12b. If this situation continues, the dilution of lubricating oil in the oil pan 12b progresses. In particular, when a so-called short trip, namely, the stoppage of the operation of the engine 1 before the completion of warm-up is repeated, the number of opportunities for evaporation of the fuel that has mixed with lubricating oil is not large enough, so the dilution of oil in the oil pan 12b progresses. Then, when the liquid fuel that dilutes this lubricating oil evaporates to be introduced into the intake passage 2 due to a rise of oil temperature or the like in the case where the oil dilution ratio becomes large, the air-fuel ratio in the cylinders 11 becomes rich. If gas fuel is used in this situation, rich misfire may be caused in this gas fuel.

In view of this point, according to the present embodiments, when there is a possibility that rich misfire may be caused in the case where gas fuel is used, the use of this gas fuel is prohibited, and the engine 1 is operated through the use of liquid fuel. Fuel-in-use change control according to the plurality of the embodiments and a modification example will be described hereinafter.

First Embodiment

A first embodiment will be described. In the present embodiment, when the ratio of dilution of lubricating oil by fuel in the oil pan 12b (the oil dilution ratio) is equal to or larger than a predetermined value after the completion of the warm-up operation, the use of gas fuel is prohibited (a change from the operation through the use of liquid fuel to the operation through the use of gas fuel is prohibited even when warm-up operation is completed) on the assumption that there is a possibility that the amount of fuel (the evaporative fuel) introduced into the intake passage 2 may become equal to or larger than a predetermined amount and there is a possibility that the air-fuel ratio in the cylinders 11 may become so rich as to cause the rich misfire in the case where gas fuel is used.

As described hitherto, when the ratio of dilution of lubricating oil by fuel (liquid fuel) in the oil pan 12b of the engine 1 is equal to or larger than the predetermined value, the use of gas fuel is prohibited. The ratio of dilution of lubricating oil by fuel (liquid fuel) in the oil pan 12b of the engine 1 is defined as, for example, the ratio of the total volume of lubricating oil and liquid fuel to the volume of lubricating oil (total volume of lubricating oil+liquid fuel/volume of lubricating oil). After that, the prohibition of the use of gas fuel is canceled on the condition that the ratio of dilution of lubricating oil by fuel in the oil pan 12b should be smaller than the predetermined value. That is, a change of the fuel in use from liquid fuel to gas fuel is permitted. This operation is performed by the engine ECU 8.

Therefore, the engine ECU 8 performs the operation (i.e., the operation that prohibits use of the gas fuel when a ratio of dilution of lubricating oil by the liquid fuel in the lubricating oil storage portion of the internal combustion engine is equal to or larger than a predetermined value, and the operation that prohibits a change of fuel in use from the liquid fuel to the gas fuel when the ratio of dilution of the lubricating oil by the liquid fuel in the lubricating oil storage portion is equal to or larger than the predetermined value, and permits the change of the fuel in use from the liquid fuel to the gas fuel on the condition that the ratio of dilution should be smaller than the predetermined value, after the completion of the warm-up).

Figure 3:
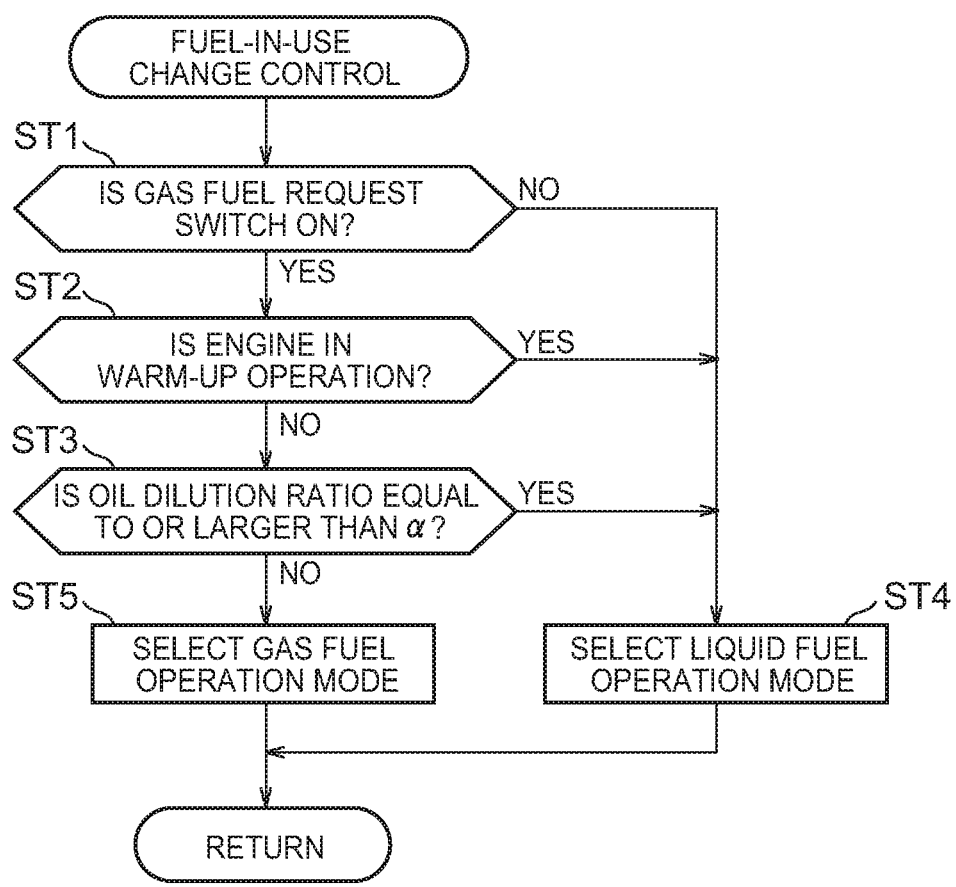
FIG. 3 is a flowchart showing the procedure of fuel-in-use change control in a first embodiment.

A procedure of fuel-in-use change control in the present embodiment will be described hereinafter using the flowchart of FIG. 3. This flowchart is repeatedly performed at intervals of a predetermined time after the engine 1 starts in response to the operation of turning the ignition switch ON.

In step ST1, the engine ECU 8 determines whether the gas fuel request switch 4 is ON (whether the driver of the vehicle requests gas fuel as the fuel in use). When the result of the determination in step ST1 is NO on the ground that the gas fuel request switch 4 is OFF, the routine proceeds to step ST4 on the assumption that the driver of the vehicle does not request the use of gas fuel. In step ST4, the engine 1 is operated in the liquid fuel operation mode. That is, the engine 1 is operated through the use of liquid fuel, regardless of whether the warm-up operation is completed, and regardless of the oil dilution ratio.

On the other hand, when the result of the determination in step ST1 is YES on the ground that the gas fuel request switch 4 is ON, the routine proceeds to step ST2, and the engine ECU 8 determines whether the current operating state of the engine 1 is a warm-up operation state. This determination is made based on, for example, a coolant temperature detected by the coolant temperature sensor 92. That is, when the coolant temperature is lower than the predetermined temperature (lower than the warm-up completion temperature), the engine ECU 8 determines that the engine 1 is in warm-up operation.

When the result of the determination in step ST2 is YES on the ground that the current operating state of the engine 1 is the warm-up operation state, the routine proceeds to step ST4, and the engine 1 is operated in the liquid fuel operation mode. That is, warm-up operation through the use of liquid fuel is continued. As described hitherto, both in the case where the gas fuel request switch 4 is OFF and in the case where the operating state of the engine 1 is the warm-up operation state, the engine 1 is operated in the liquid fuel operation mode.

On the other hand, when the result of the determination in step ST2 is NO on the ground that the current operating state of the engine 1 is not the warm-up operation state (i.e., warm-up operation is completed), the routine proceeds to step ST3, and the engine ECU 8 determines whether the oil dilution ratio is equal to or larger than a predetermined value α. This predetermined value α is set in advance through an experiment or a simulation as an oil dilution ratio at which the air-fuel ratio in the cylinders 11 may become small to the extent of causing the rich misfire.

As an operation of estimating the oil dilution ratio, the oil dilution ratio is calculated, for example, based on an operation history of the engine 1 in the past (a history of the amount of liquid fuel injected from the liquid fuel injectors 65 or the load factor, the engine rotational speed and the like as well as a history of the oil temperature and coolant temperature of the engine 1) and the concentration of alcohol in liquid fuel. Further, this oil dilution ratio is calculated in consideration of the amount of evaporation of fuel from the oil pan 12b as well, based on the rotational speed, oil temperature and the like of the engine 1. Further, an optical sensor or the like may be disposed in the oil pan 12b, and an oil dilution ratio may be estimated (calculated) from an output signal thereof.

When the result of the determination in step ST3 is YES on the ground that this oil dilution ratio is equal to or larger than the predetermined value α, the routine proceeds to step ST4, and the engine 1 is operated in the liquid fuel operation mode. That is, even in the case where warm-up operation of the engine 1 is completed (even in the case where the result of the determination in step ST2 is NO), when the oil dilution ratio is equal to or larger than the predetermined value α, the operation of the engine 1 in the gas fuel operation mode is prohibited, and the engine 1 is operated in the liquid fuel operation mode. The operation in the steps ST3 and ST4 may be regarded as "the operation that prohibits use of the gas fuel (the operation that prohibits a change of fuel in use from the liquid fuel to the gas fuel) when the ratio of dilution of the lubricating oil by the liquid fuel in the lubricating oil storage portion of the internal combustion engine is equal to or larger than the predetermined value".

On the other hand, when the result of the determination in step ST3 is NO on the ground that the oil dilution ratio is smaller than the predetermined value α, the routine proceeds to step ST5, and the operation of the engine 1 is changed from the operation in the liquid fuel operation mode to the operation in the gas fuel operation mode. That is, the operation of the engine 1 is changed to the operation in the gas fuel operation mode on the assumption that the possibility that the air-fuel ratio in the cylinders 11 becomes rich due to the fuel evaporated in the oil pan 12b is low because the oil dilution ratio is smaller than the predetermined value α. The operation in the steps ST3 and ST5 may be regarded as "the operation that permits the change of the fuel in use from the liquid fuel to the gas fuel on the condition that the ratio of dilution of the lubricating oil by the liquid fuel in the lubricating oil storage portion should be smaller than the predetermined value, after the completion of the warm-up".

In the routine that is performed next time after the operation of the engine 1 is changed to the operation in the gas fuel operation mode in the above-described manner, the result of the determination in step ST3 is NO, and the operation of the engine 1 in the gas fuel operation mode is continued, unless the gas fuel request switch 4 is turned OFF (unless the result of the determination in step ST1 is NO). The foregoing control operation is repeated.

Since this fuel-in-use change control is performed, the control apparatus for the internal combustion engine according to the disclosure includes the engine ECU 8. This control apparatus is configured to receive respective signals from the crank position sensor 91, the coolant temperature sensor 92, the gas fuel request switch 4 and the like, as input signals. This control apparatus is configured to output respective signals to the fuel pump 62, the liquid fuel injectors 65, the gas fuel injectors 74, the first shutoff valve 75, the second shutoff valve 76 and the like, as output signals.

As described hitherto, in the present embodiment, when the oil dilution ratio is equal to or larger than the predetermined value (when the air-fuel ratio in the cylinders 11 may become small as a result of the introduction of the fuel evaporated in the oil pan 12b into the intake passage 2), the use of gas fuel is prohibited (the operation of the engine 1 in the gas fuel operation mode is prohibited even when warm-up operation of the engine 1 is completed). Therefore, it is possible to avoid the rich misfire of gas fuel and to prevent engine stall by refraining from using gas fuel in a situation where the air-fuel ratio in the cylinders 11 becomes small.

Second Embodiment

Next, the second embodiment will be described. In the present embodiment as well as the foregoing first embodiment, when the oil dilution ratio is equal to or larger than the predetermined value after the completion of the warm-up operation, the use of gas fuel is prohibited (a change from the operation through the use of liquid fuel to the operation through the use of gas fuel is prohibited even when warm-up operation is completed) on the assumption that the amount of fuel (the evaporative fuel) introduced into the intake passage 2 may become equal to or larger than the predetermined amount and the air-fuel ratio in the cylinders 11 may become so rich as to cause the rich misfire in the case where gas fuel is used.

Then, in the present embodiment, when the oil dilution ratio becomes smaller than the predetermined value, the fuel in use is changed from liquid fuel to gas fuel after an elapse of a predetermined time from the time point at which the oil dilution ratio becomes smaller than the predetermined value. This operation is performed by the engine ECU 8.

Therefore, the engine ECU 8 performs the operation (i.e., the operation that prohibits a change of fuel in use from the liquid fuel to the gas fuel when the ratio of dilution of the lubricating oil by the liquid fuel in the lubricating oil storage portion is equal to or larger than the predetermined value, and permits the change of the fuel in use from the liquid fuel to the gas fuel after an elapse of a predetermined time from at time point at which the ratio of dilution becomes smaller than the predetermined value, after the completion of the warm-up).

Figure 4:
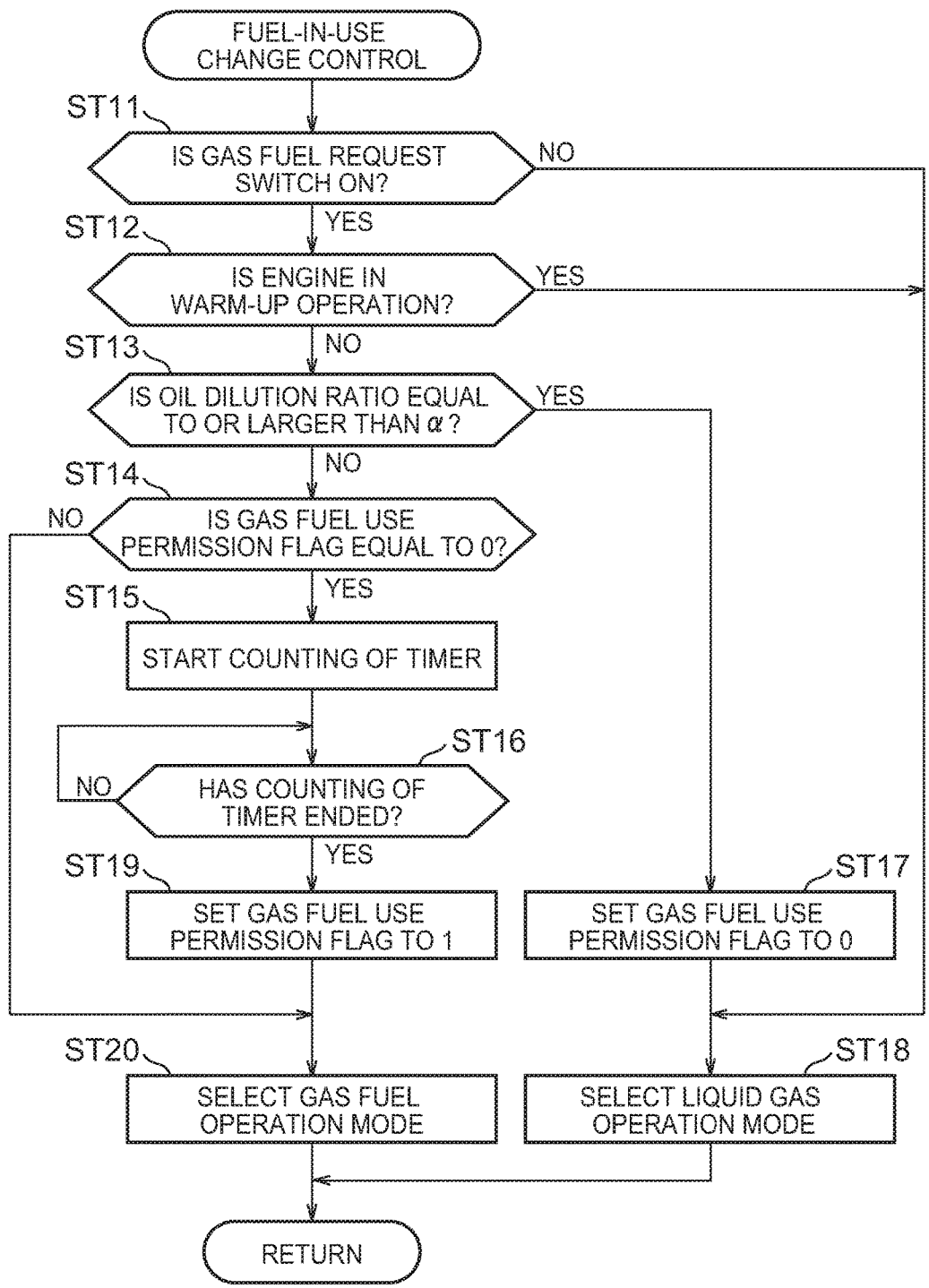
FIG. 4 is a flowchart showing the procedure of fuel-in-use change control in a second embodiment.

A procedure of fuel-in-use change control in the present embodiment will be described hereinafter using the flowchart of FIG. 4. This flowchart is repeatedly performed at intervals of a predetermined time after the engine 1 starts in response to an operation of turning the ignition switch ON.

In step ST11, the engine ECU 8 determines whether the gas fuel request switch 4 is ON (whether the driver of the vehicle requests gas fuel as the fuel in use). When the result of the determination in step ST11 is NO on the ground that the gas fuel request switch 4 is OFF, the routine proceeds to step ST18 on the assumption that the driver of the vehicle does not request the use of gas fuel. In step ST18, the engine 1 is operated in the liquid fuel operation mode. That is, the engine 1 is operated through the use of liquid fuel.

On the other hand, when the result of the determination in step ST11 is YES on the ground that the gas fuel request switch 4 is ON, the routine proceeds to step ST12, and the engine ECU 8 determines whether the current operating state of the engine 1 is a warm-up operation state. As described above, this determination is made based on, for example, the coolant temperature detected by the coolant temperature sensor 92. That is, when the coolant temperature is lower than the predetermined temperature (lower than the warm-up completion temperature), the engine ECU 8 determines that the engine 1 is in warm-up operation.

When the result of the determination in step ST12 is YES on the ground that the current operating state of the engine 1 is the warm-up operation state, the routine proceeds to step ST18, and the engine 1 is operated in the liquid fuel operation mode. That is, warm-up operation through the use of liquid fuel is continued. As described hitherto, the engine 1 is operated in the liquid fuel operation mode both in the case where the gas fuel request switch 4 is OFF and in the case where the operating state of the engine 1 is the warm-up operation state.

On the other hand, when the result of the determination in step ST12 is NO on the ground that the current operating state of the engine 1 is not the warm-up operation state (warm-up operation is completed), the routine proceeds to step ST13, and the engine ECU 8 determines whether the oil dilution ratio is equal to or larger than the predetermined value α. The method of setting this predetermined value α and the operation of estimating the oil dilution ratio are the same as those in the first embodiment.

When the result of the determination in step ST13 is YES on the ground that this oil dilution ratio is equal to or larger than the predetermined value α, the routine proceeds to step ST17, and a gas fuel use permission flag stored in the RAM of the engine ECU 8 is reset to 0. Then, the routine proceeds to step ST18, and the engine 1 is operated in the liquid fuel operation mode. That is, even in the case where warm-up operation of the engine 1 is completed (even in the case where the result of the determination in step ST12 is NO), when the oil dilution ratio is equal to or larger than the predetermined ratio α, the operation of the engine 1 in the gas fuel operation mode is prohibited, and the engine 1 is operated in the liquid fuel operation mode. The operation in the steps ST13, ST17 and ST18 may be regarded as "the operation that prohibits use of the gas fuel (the operation that prohibits a change of fuel in use from the liquid fuel to the gas fuel) when the ratio of dilution of the lubricating oil by the liquid fuel in the lubricating oil storage portion of the internal combustion engine is equal to or larger than the predetermined value".

On the other hand, when the result of the determination in step ST13 is NO on the ground that the oil dilution ratio is smaller than the predetermined value α, the routine proceeds to step ST14, and the engine ECU 8 determines whether the gas fuel use permission flag is 0. This determination is performed to determine whether the oil dilution ratio has just become smaller than the predetermined value α in the current routine, in a state where the engine 1 is operated in the liquid fuel operation mode.

When the result of the determination in step ST14 is YES on the ground that the gas fuel use permission flag is 0, the routine proceeds to step ST15, and the counting of a timer stored in the RAM of the engine ECU 8 is started. This timer is provided to delay the change from the operation in the liquid fuel operation mode to the operation in the gas fuel operation mode, when this change is made based on the fact that the oil dilution ratio becomes smaller than the predetermined value α. That is, even when the oil dilution ratio becomes smaller than the predetermined value α, there is a possibility that the fuel evaporated in the oil pan 12b may still remain in the blow-by gas collecting passage, the blow-by gas recirculation pipe 18a and the intake passage 2. Therefore, when the operation of the engine 1 is changed to the operation in the gas fuel operation mode at the time point at which the oil dilution ratio becomes smaller than the predetermined value α, this remaining fuel may be thereafter introduced into the cylinders 11, and the air-fuel ratio in the cylinders 11 may become rich. Therefore, the change to the gas fuel operation mode is made after the remaining fuel is caused to contribute to the combustion in the cylinders 11 by delaying the change (i.e., delaying the change to the gas fuel operation mode) with the use of the timer. Accordingly, the time period from the start of the counting of this timer to the end of the counting is set in advance through an experiment or a simulation, as a time period until the remaining fuel contributes to the combustion in the cylinders 11. Besides, this time period changes depending on the rotational speed of the engine 1. Therefore, it is preferable that this time period should be set through an experiment or a simulation as a time period until the remaining fuel contributes to the combustion in the cylinders 11 in an idling operating state.

In step ST16, the engine ECU 8 determines whether the counting of the timer has ended. When the counting of the timer has not ended yet, the engine ECU 8 waits for the end of this counting. Then, when the result of the determination in step ST16 is YES on the ground that the counting of the timer has ended, the routine proceeds to step ST19, and the gas fuel use permission flag is set to 1. Then, the routine proceeds to step ST20, and the operation of the engine 1 is changed from the operation in the liquid fuel operation mode to the operation in the gas fuel operation mode. That is, the operation of the engine 1 is changed to the operation in the gas fuel operation mode on the assumption that the air-fuel ratio in the cylinders 11 does not become rich due to the fuel evaporated in the oil pan 12*b* because the oil dilution ratio is smaller than the predetermined value α and the remaining fuel has contributed to the combustion in the cylinders 11. The operation in the steps ST13 to ST16, ST19 and ST20 may be regarded as "the operation that permits the change of the fuel in use from the liquid fuel to the gas fuel after an elapse of a predetermined time from a time point at which the ratio of dilution of the lubricating oil by the liquid fuel in the lubricating oil storage portion becomes smaller than the predetermined value, after the completion of the warm-up".

In the routine that is performed next time after the operation of the engine 1 is changed to the operation in the gas fuel operation mode, the result of the determination in step ST14 is NO, and the operation of the engine 1 in the gas fuel operation mode is continued unless the gas fuel request switch 4 is turned OFF (unless the result of the determination in step ST11 is NO). The foregoing control operation is repeated.

This fuel-in-use change control is performed, and thus, the control apparatus for the internal combustion engine includes the engine ECU 8 in the present embodiment as well. This control apparatus is configured to receive respective signals from the crank position sensor 91, the coolant temperature sensor 92, the gas fuel request switch 4 and the like, as input signals. Further, this control apparatus is configured to output respective signals to the fuel pump 62, the liquid fuel injectors 65, the gas fuel injectors 74, the first shutoff valve 75, the second shutoff valve 76 and the like, as output signals.

Figure 5:
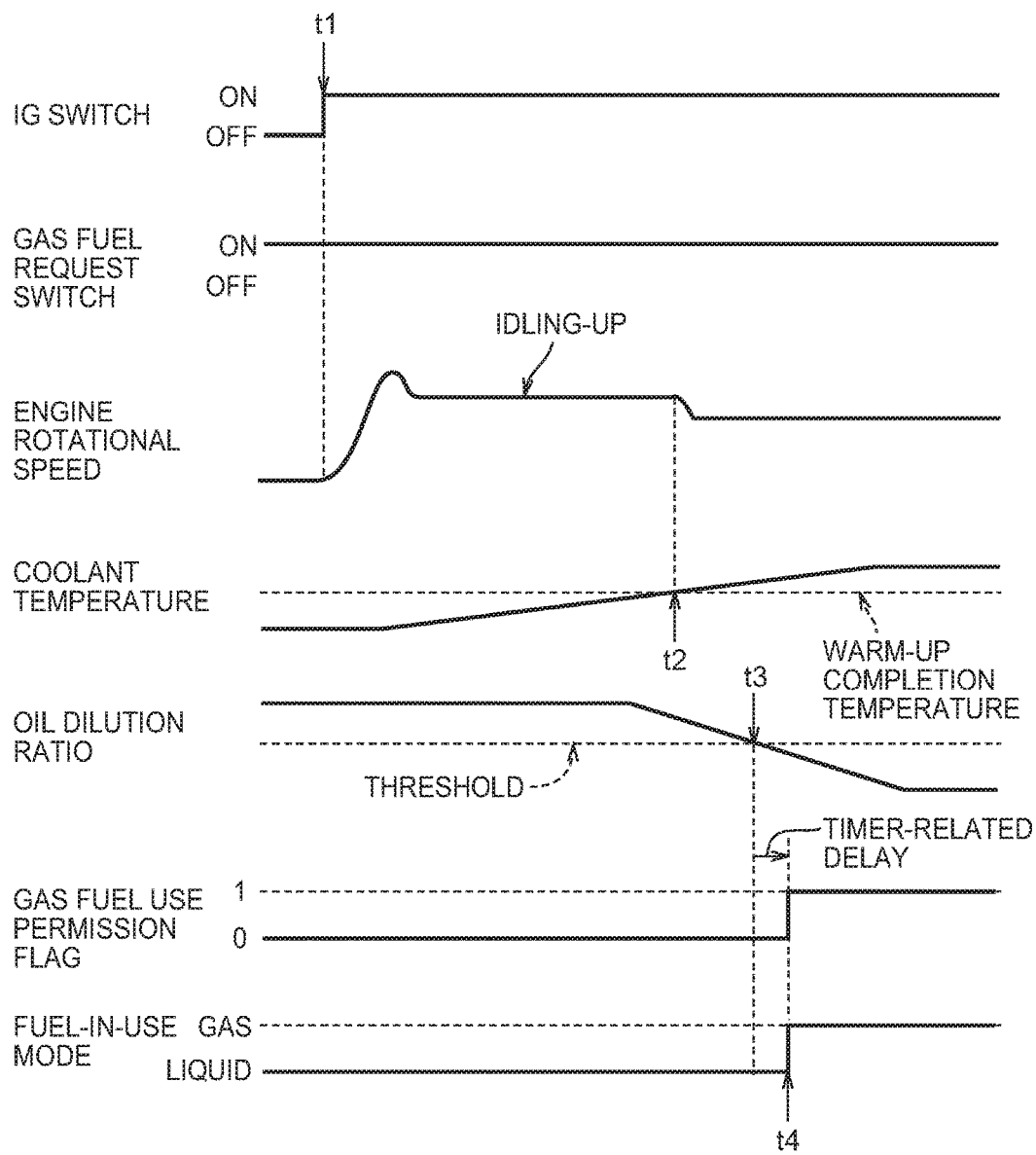
FIG. 5 is a timing chart showing an example of fuel-in-use change operation in the second embodiment.

FIG. 5 is a timing chart showing an example of the fuel-in-use change operation. This time chart shows changes in the state of the ignition switch in a cold state, the state of the gas fuel request switch 4, the engine rotational speed, the coolant temperature, the oil dilution ratio, the gas fuel use permission flag, and the mode of the fuel supply system (a fuel-in-use mode).

At a timing t1 in FIG. 5, the ignition switch is turned ON, and the engine 1 starts. In this case, the coolant temperature is lower than the warm-up completion temperature, and therefore, warm-up operation of the engine 1 is started in the liquid fuel operation mode. Idling-up control for the engine 1 is performed during this warm-up operation. The oil dilution ratio is equal to or larger than a predetermined value (a threshold in the drawing). Due to the continuation of warm-up operation of this engine 1, the coolant temperature rises, and the oil dilution ratio gradually decreases.

When the coolant temperature reaches the warm-up completion temperature at a timing t2 in FIG. 5, warm-up operation of the engine 1 is completed, and idling-up control for the engine 1 ends, and thus, the engine rotational speed decreases.

Then, at a timing t3 in FIG. 5, the oil dilution ratio decreases to be lower than the predetermined value. The counting of the timer is started at this time point. When the counting of the timer ends at a timing t4, the mode of the fuel supply system is changed from the liquid fuel operation mode to the gas fuel operation mode.

As described above, according to the present embodiment as well as the first embodiment, when the oil dilution ratio is equal to or larger than the predetermined value, the use of gas fuel is prohibited. Therefore, it is possible to avoid the rich misfire of gas fuel and to prevent engine stall by refraining from using gas fuel in a situation where the air-fuel ratio in the cylinders 11 becomes small.

In the present embodiment, when the oil dilution ratio becomes smaller than the predetermined value, the fuel in use is changed from liquid fuel to gas fuel after the elapse of the predetermined time from that time point at which the oil dilution ratio becomes smaller than the predetermined value. Therefore, it is possible to avoid the rich misfire of gas fuel resulting from the remaining fuel (the evaporative fuel that still remains in the blow-by gas collecting passage, the blow-by gas recirculation pipe 18*a* and the like at the time point at which the oil dilution ratio becomes smaller than the predetermined value α).

Modification Example

Next, the modification example will be described. In each of the foregoing embodiments, when the oil dilution ratio in the oil pan 12*b* of the engine 1 is equal to or larger than the predetermined value, the use of gas fuel is prohibited (a change of the fuel in use from liquid fuel to gas fuel is prohibited). Instead, in the present modification example, the use of gas fuel is prohibited (a change of the fuel in use from liquid fuel to gas fuel is prohibited) when the amount of fuel (liquid fuel) mixed in lubricating oil in the oil pan 12*b* of the engine 1 is equal to or larger than a predetermined amount.

More specifically, the amount of mixed fuel (mixed liquid fuel) in the oil pan 12*b* is calculated based on the history of the operation of the engine 1 in the past (the history of the amount of liquid fuel injected from the liquid fuel injectors 65 or the load factor, the engine rotational speed and the like as well as the history of the oil temperature and coolant temperature of the engine 1) and the concentration of alcohol in liquid fuel. Then, when the amount of mixed liquid fuel is equal to or larger than the predetermined amount, the engine 1 is operated in the liquid fuel operation mode. That is, even in the case where warm-up operation of the engine 1 is completed, when the amount of mixed liquid fuel is equal to or larger than the predetermined value, the operation of the engine 1 in the gas fuel operation mode is prohibited, and the engine 1 is operated in the liquid fuel operation mode. The predetermined amount (a threshold of the amount of mixed liquid fuel for determining whether to prohibit the use of gas fuel) is set in advance through an experiment or a simulation as an amount of mixed liquid fuel at which the air-fuel ratio in the cylinders 11 may become so small as to cause the rich misfire.

On the other hand, when the amount of mixed liquid fuel becomes smaller than the predetermined amount, the operation of the engine 1 is changed from the operation in the liquid fuel operation mode to the operation in the gas fuel operation mode.

More specifically, in the case where the technical concept of this modification example (the concept in which the operation mode is changed in accordance with the amount of liquid fuel mixed in lubricating oil in the oil pan 12*b*) is applied to the first embodiment, the operation of the engine 1 is changed from the operation in the liquid fuel operation mode to the operation in the gas fuel operation mode at the time point at which the amount of mixed liquid fuel becomes smaller than the predetermined amount.

On the other hand, in the case where the technical concept of this modification example is applied to the second embodiment, the counting of the timer is started at the time point at which the amount of mixed liquid fuel becomes smaller than the predetermined amount. When the counting of this timer ends, the gas fuel use permission flag is set to 1, and the operation of the engine 1 is changed from the operation in the liquid fuel operation mode to the operation in the gas fuel operation mode.

The above-described operations are performed by the engine ECU 8. Thus, the engine ECU 8 performs the operations (i.e., the operation that prohibits use of the gas fuel when an amount of the liquid fuel mixed in the lubricating oil in the lubricating oil storage portion of the internal combustion engine is equal to or larger than a predetermined amount, and the operation that prohibits a change of fuel in use from the liquid fuel to the gas fuel when the amount of the liquid fuel mixed in the lubricating oil in the lubricating oil storage portion is equal to or larger than the predetermined amount, and permits the change of the fuel in use from the liquid fuel to the gas fuel after an elapse of a predetermined time from a time point at which the amount of the mixed liquid fuel becomes smaller than the predetermined amount, after the completion of the warm-up). Other configurational details and operations are the same as those in the embodiments.

In the present modification example as well as the embodiments, when there is a possibility that the air-fuel ratio in the cylinders 11 may become small as a result of the introduction of the fuel evaporated in the oil pan 12*b* into the intake passage 2, the use of gas fuel is prohibited. Therefore, it is possible to avoid the rich misfire of gas fuel and to prevent engine stall by refraining from using gas fuel in a situation where the air-fuel ratio in the cylinders 11 becomes small.

Other Embodiments

In the embodiments and the modification example described above, the disclosure is applied to the engine 1 in which liquid fuel is used during warm-up operation after cold start of the engine 1 and the fuel in use is changed from liquid fuel to gas fuel after the completion of warm-up of the engine 1, on the condition that the gas fuel request switch 4 should be ON. The disclosure is not limited to this case, and is also applicable to the engine 1 in which gas fuel is used during warm-up operation after cold start of the engine 1 on the condition that the gas fuel request switch 4 should be ON, and the fuel in use is changed from gas fuel to liquid fuel after the completion of warm-up of the engine 1. In this case, when the oil dilution ratio at the time of cold start of the engine 1 is equal to or larger than a predetermined value or when the amount of mixed liquid fuel in the oil pan 12*b* at the time of cold start of the engine 1 is equal to or larger than a predetermined amount, the use of gas fuel is prohibited, and warm-up operation is started through the use of liquid fuel. Then, when the oil dilution ratio becomes smaller than the predetermined value during the warm-up operation or when the amount of mixed liquid fuel in the oil pan 12*b* at the time of cold start of the engine 1 becomes smaller than the predetermined amount, warm-up operation is performed through the use of gas fuel until the warm-up operation is completed. Then, when warm-up operation is completed, the operation of the engine is changed from the operation through the use of gas fuel to the operation through the use of liquid fuel.

In the embodiments and the modification example, CNG is adopted as gas fuel, but the disclosure is not limited thereto. Gas fuels such as hydrogen, liquefied petroleum gas (LPG) and the like may be adopted. That is, examples of the gas fuel in the disclosure include liquid gas fuel (the LPG) that is stored in a liquid phase and that is supplied in the liquid phase (that is supplied as liquid spray) toward the inside of the cylinders 11 as well as gas fuel (the CNG or hydrogen) that is stored in a gas phase and that is supplied in the gas phase toward the inside of the cylinders 11.

In the embodiments and the modification example, liquid fuel containing alcohol and gasoline is adopted as liquid fuel, but the disclosure is not limited thereto. Liquid fuel containing alcohol alone can also be adopted.

The use of gas fuel may be prohibited upon fulfillment of at least one of the condition that the oil dilution ratio should be equal to or larger than the predetermined value and the condition that the amount of liquid fuel mixed in lubricating oil in the oil pan 12*b* should be equal to or larger than the predetermined amount.

The disclosure is applicable to the control for avoiding the rich misfire of gas fuel in an internal combustion engine in which fuel in use can be changed between alcohol-containing liquid fuel and gas fuel.

What is claimed is:

1. A control apparatus of an internal combustion engine in which fuel used for operation is changed between liquid fuel containing alcohol and gas fuel, the control apparatus comprising:
    an electronic control unit configured to change a supply of fuel in the internal combustion engine from the liquid fuel to the gas fuel, the internal combustion engine being operated by the liquid fuel during a warm-up operation and being operated by the gas fuel after completion of the warm-up operation, the electronic control unit controlling the supply of fuel by being configured to:
        prohibit the change of fuel from the liquid fuel to the gas fuel based on: (i) a ratio of dilution of lubricating oil by the liquid fuel in a lubricating oil storage portion of the internal combustion engine being equal to or greater than a predetermined value after completion of the warm-up operation, or (ii) an amount of the liquid fuel mixed in the lubricating oil in the lubricating oil storage portion being equal to or greater than a predetermined amount after the completion of the warm-up operation; and
        permit the change of fuel from the liquid fuel to the gas fuel based on: (i) the ratio of dilution of lubricating oil being less than the predetermined value, or (ii) the amount of the liquid fuel mixed in the lubricating oil in the lubricating oil storage portion being less than the predetermined amount after the completion of the warm-up operation.

2. A control apparatus of an internal combustion engine in which fuel used for operation is changed between liquid fuel containing alcohol and gas fuel, the control apparatus comprising:
    an electronic control unit configured to change a supply of fuel in the internal combustion engine from the liquid fuel to the gas fuel, the internal combustion engine being operated by the liquid fuel during a warm-up operation and being operated by the gas fuel after completion of the warm-up operation, the electronic control unit controlling the supply of fuel by being configured to:

prohibit the change of the supply of fuel in use from the liquid fuel to the gas fuel when (i) a ratio of dilution of lubricating oil by the liquid fuel in a lubricating oil storage portion is equal to or greater than a predetermined value, or (ii) the amount of the liquid fuel mixed in the lubricating oil in the lubricating oil storage portion is equal to or greater than the predetermined amount, after completion of the warm-up; and permit the change of the supply of fuel in use from the liquid fuel to the gas fuel after an elapse of a predetermined time from a time point at which (i) the ratio of dilution is less than the predetermined value, or the amount of the mixed liquid fuel is less than the predetermined amount, after completion of the warm-up.

\* \* \* \* \*